US008867727B2

(12) United States Patent
Gudlavenkatasiva (10) Patent No.: US 8,867,727 B2
(45) Date of Patent: Oct. 21, 2014

(54) TELEPHONE NUMBER GROUPS

(75) Inventor: Bhaskar R. Gudlavenkatasiva, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 572 days.

(21) Appl. No.: 12/825,944

(22) Filed: Jun. 29, 2010

(65) Prior Publication Data

US 2011/0320449 A1 Dec. 29, 2011

(51) Int. Cl.
*H04M 3/42* (2006.01)
*H04Q 3/545* (2006.01)
*H04M 3/22* (2006.01)

(52) U.S. Cl.
CPC ............... *H04Q 3/545* (2013.01); *H04M 3/229* (2013.01)
USPC ..................................................... 379/218.01

(58) Field of Classification Search
USPC .................................................... 379/218.01
See application file for complete search history.

(56) References Cited

U.S. PATENT DOCUMENTS

| 6,359,980 | B1* | 3/2002 | Petrelli et al. ............ 379/221.13 |
| 6,546,382 | B1* | 4/2003 | Amor et al. ........................... 1/1 |
| 6,606,381 | B1* | 8/2003 | Wunsch ................... 379/356.01 |
| 2005/0076018 | A1* | 4/2005 | Neidecker-Lutz ................ 707/3 |
| 2008/0198987 | A1* | 8/2008 | Daly ........................ 379/114.05 |
| 2009/0287533 | A1* | 11/2009 | Swamynathan et al. ........ 705/10 |
| 2010/0239084 | A1* | 9/2010 | Brown et al. ............ 379/218.01 |

* cited by examiner

*Primary Examiner* — Mahesh Dwivedi (57) ABSTRACT

A method includes receiving a list of sequential telephone numbers, and iteratively: identifying a first number and a last number of the list, selecting a group size, creating a group of sequential telephone numbers from the list of sequential telephone numbers based on the selected group size, and removing the created group from the list of sequential telephone numbers. Creating the group may include determining whether a first number in the list of sequential telephone numbers ends with a predetermined digit, assigning the first number as a start number of the group, and identifying an end number in the group based on the start number and the selected group size.

20 Claims, 6 Drawing Sheets

TELEPHONE NUMBER GROUPS

BACKGROUND

Telecommunications carriers are assigned groups of telephone numbers consistent with a geographic number plan such as the North American Numbering Plan. These groups of numbers are available for carriers to assign to the carrier's customers. Individual customers often only need one or two telephone numbers, while businesses customers often need larger groups of telephone numbers. The carrier can assign vacant (e.g., available) telephone numbers to its customers based on the customer's request. In doing so, the carrier, either automatically or through its representatives, will often break up large groups of telephone numbers in a disorganized way. For instance, the carrier may use an automated process that selects a group of sequential telephone numbers without considering that certain telephone numbers are more desirable by some customers than as compared to others. For instance, a customer who desires a sequential group of ten telephone numbers would likely prefer the numbers "813-999-0000" through "813-999-0009" to the numbers "813-999-0023" through "813-999-0032." In addition, a sales person may assign one number from a group of sequential telephone numbers to an individual customer and unknowingly break up a larger group that would have been more profitable to the carrier if the numbers were sold as a group to a business customer. Accordingly, a system and process are needed that groups telephone numbers in a way that considers those numbers that are more desirable to customers and prevents sales persons from breaking up groups of sequential telephone numbers that are more profitable if left intact.

DETAILED DESCRIPTION

An exemplary method includes receiving a list of vacant (e.g., available) sequential telephone numbers, and via a computing device, iteratively identifying a first number and a last number of the list, selecting a group size, creating a group of sequential telephone numbers from the list of sequential telephone numbers based on the selected group size, and removing the created group from the list of sequential telephone numbers. Creating the group may include determining whether a first number in a list of sequential telephone numbers ends with a predetermined digit, assigning the first number as a start number of the group, and identifying an end number in the group based on the start number and a selected group size. In one exemplary approach, the end number is further chosen to end with the predetermined digit. The exemplary system and method disclosed herein may be used by a carrier to efficiently group vacant telephone numbers in a way that considers those telephone numbers that are more desirable by customers and that prevents sales persons from unknowingly breaking up groups of telephone numbers that would be more profitable if left intact.

The processes described herein may be iteratively performed so long as the carrier has vacant telephone numbers to assign to customers. For instance, the process to group telephone numbers may be performed as soon as vacant telephone numbers are received by the carrier, when telephone numbers previously assigned to customers become vacant (e.g., a business customer cancels its account and the group of telephone numbers previously assigned to the business customer become available to other customers), a sales person assigns a telephone number that is part of a group of sequential telephone numbers to an individual customer, etc. By iteratively performing the processes described herein, the groups of telephone numbers available are likely to be those that are most appealing to customers.

Figure 1:
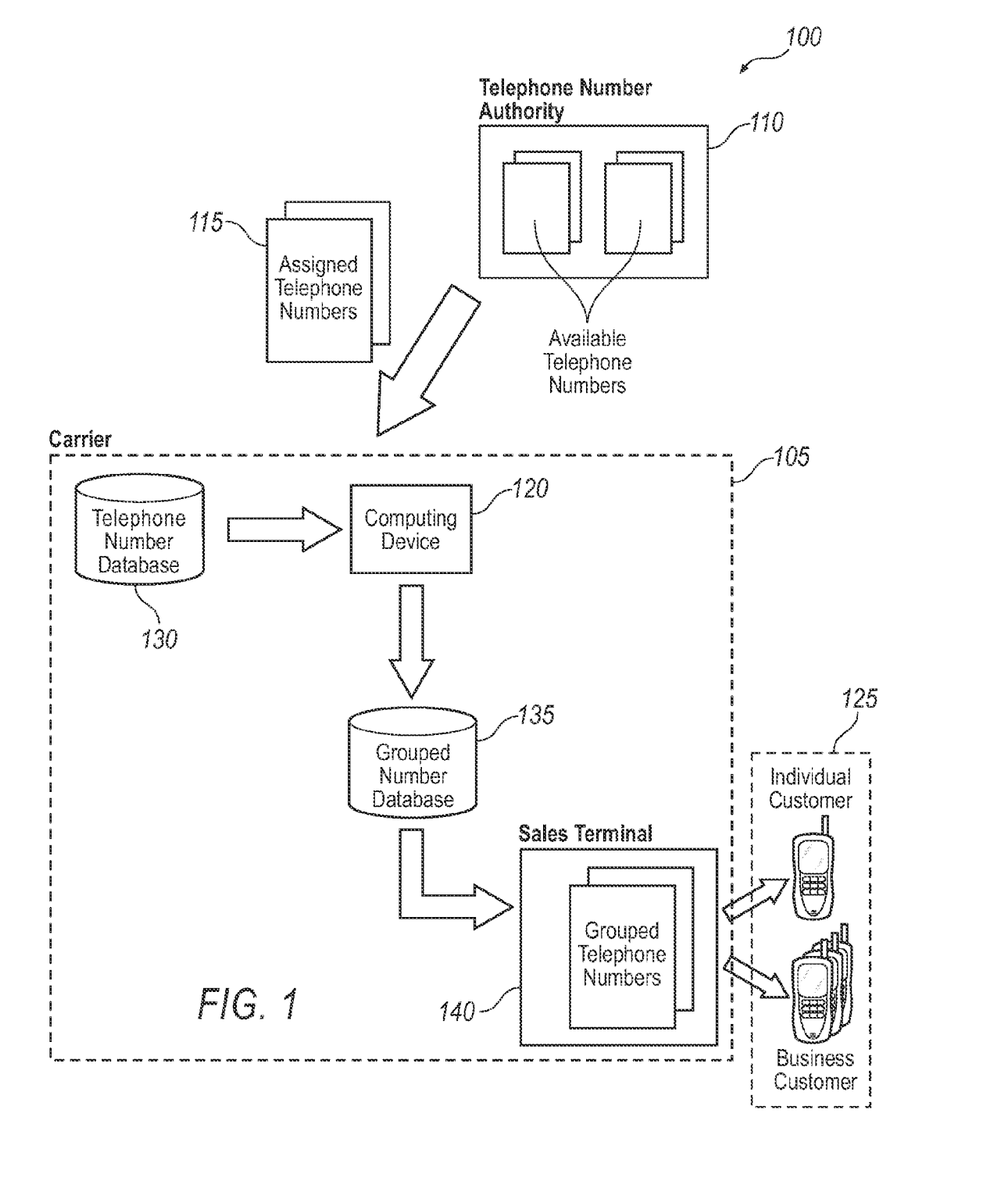
FIG. 1 illustrates an exemplary system configured to group telephone numbers.

FIG. 1 illustrates an exemplary system 100 that is configured to create groups of sequential telephone numbers of predetermined sizes. System 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

As illustrated in FIG. 1, the system 100 includes a carrier 105 in communication with a telephone number authority 110. The carrier 105 receives a list 115 of assigned telephone numbers from the telephone number authority 110 so that the carrier 105 can assign one or more telephone numbers to its customers 125. The carrier 105 may include any entity that provides telecommunications services to its customers 125. The carrier 105 may include a local exchange carrier, wireless carrier, mobile network operator, Internet service provider, etc.

The carrier 105 may include a computing device 120 configured to separate sequential telephone numbers into groups of predetermined sizes. While a single computing device 120 is illustrated, the computing device 120 may include multiple separate computing devices. The computing device 120 may include any computing device configured to identify the first and last number in a sequential list 115 of telephone numbers and create groups of telephone numbers between and including the first and last number. The groups created may be defined by one or more group sizes. For instance, the computing device 120 may be configured to create groups of telephone numbers in multiples of tens (e.g., 10 numbers, 20 numbers, 30 numbers, 100 numbers, 1000 numbers, etc.). Further, the computing device 120 may be configured to designate a maximum group size (e.g., no more than 10 numbers, no more than 100 numbers, no more than 1000 numbers, etc.) for each group. The computing device 120 may select the group size based on any number of factors including the size of the list 115 received from the telephone number authority 110, the size of the geographic region in which the telephone numbers will be used, or historical data. For example, for a geographic region serviced by the carrier 105 that has customers 125 who employ hundreds or thousands of employees, the computing device 120 may be configured to select group sizes that create large groups with hundreds or thousands of telephone numbers. Alternatively, for geographic regions where the customers 125 of the carrier 105 include many businesses that employ less than 100 employees, the computing device 120 may be configured to select varying group sizes between 10 telephone numbers and 200 telephone numbers. Historical data may also indicate to the carrier 105 that the majority of customers 125 prefer a specific group size (e.g., 50 telephone numbers). In response, the computing device 120 may be configured to create more groups of that specific size to accommodate the customer 125. Exemplary ways in which the computing device 120 creates groups of telephone numbers will be discussed in greater detail below with respect to FIGS. 3-7.

Some telephone numbers have greater value to customers 125 than other telephone numbers. The computing device 120 may be further configured to create desirable groups of telephone numbers by starting each group with telephone numbers of higher perceived value and selecting numbers ending with a less desirable digit as the end number of the group. For example, some customers 125 may only wish to purchase groups of telephone numbers where the start number ends with, for instance, the numbers "5" or "0." Therefore, the computing device 120 may be configured to create one or more groups of telephone numbers to comply with this request by preventing numbers that end with specific predetermined digits from being the start number of the group. If the first number in the list 115 is an acceptable start number (e.g., the last digit of the first number ends with a "5" or "0"), the computing device 120 may be configured to identify the first number in the list 115 as the start number of the group. It is possible, however, for the last digit of the first number in the list 115 to be one of the less desirable predetermined digits (e.g., the number "9"). In that instance, the computing device 120 may be configured to increment the first number until the first number ends with, for example, either the number "0" or the number "5."

To ensure that each group begins with a specific number (e.g., "0" or "5"), the computing device 120 may be configured to create groups where the last number ends with a specific digit. By way of example only, customers 125 may desire groups of telephone numbers where the last digit is the number "0." However, the first number in the list 115 of telephone numbers received from the telephone number authority 110 may not end with the number "0." Therefore, the computing device 120 may be configured to remove the first few numbers from the list 115 until the first number ends with a more desirable number (e.g., the number "0"). For instance, the last four digits of the first number in the list 115 may be "0043." In this exemplary approach, the computing device 120 may be configured to create a group with the numbers ending with "0043" (i.e., the start number of the group) through "0049" (i.e., the end number of the group) since the number ending with the digits "0049" is the last number before a number in the list 115 that ends with the number "0". The computing device 120 may remove these numbers from the list 115 and make these numbers, as a group or individually, available to be assigned to customers 125.

After removing the previously created group from the list 115, the computing device 120 may be configured to increment the end number of the previously created group and select that incremented number as the start number of the next group. In the previous example, the end number of the previously created group was the number that ended with "0049." Continuing with that example, the next number in the sequential list 115 ends with the numbers "0050," making this the incremented end number, and therefore, the start number of the next group. So long as each subsequent group has a group size that is a multiple of ten, the last digit of each end number of the groups created by the computing device 120 will be the number "9" and the last digit of each start number of the groups can be the number "0," thus creating desirable groups of telephone numbers.

The computing device 120 may create groups of different sizes from the same list 115 of sequential telephone numbers. Continuing with the previous example, the first group created included seven telephone numbers (e.g., "0043" through "0049"). As previously discussed, the start number is the telephone number ending with "0050." The selected group size for this group may be 100 telephone numbers. If so, the computing device 120 is configured to select the telephone number ending with "0149" as the end number of this newly-created group. Therefore, the telephone numbers ending with "0050" through "0149" are available as a single group for assignment to the customer 125.

The computing device 120 may further be configured to perform other tasks such as determining whether the first number in the list 115 is smaller than the last number. Doing so may ensure that the list 115 of telephone numbers received from the telephone number authority 110 was formatted properly (e.g., ascending order). Moreover, the computing device 120 may be configured to determine whether the list 115 of telephone numbers includes at least two telephone numbers. In one exemplary approach, the computing device 120 may subtract the last four digits of the first number from the last four digits of the last number. If the difference between those two numbers is greater than or equal to two, the computing device 120 may conclude that the list 115 includes two or more telephone numbers.

The carrier 105 may further include various databases in communication with the computing device 120. For instance, a telephone number database 130 may store lists of telephone numbers received by the carrier 105 from the telephone number authority 110. The telephone numbers stored in the telephone number database 130 are the numbers that are available for the carrier 105 to assign to its customers 125. The carrier 105 may further include a grouped number database 135 that stores the grouped telephone numbers. The grouped number database 135 may store those telephone numbers that are arranged into groups by the computing device 120. Although illustrated as a separate database, the grouped number database 135 may be part of the telephone number database 130.

The carrier 105 may further include a sales terminal 140 configured to query the grouped number database 135 and retrieve a list of groups of sequential telephone numbers stored in the grouped number database 135. In one exemplary approach, the carrier 105 may employ one or more sales persons to interact with customers 125 and help customers 125 receive the desired amount of telephone numbers. Individual customers 125 may only need one or two telephone numbers while business customers 125 may require many more telephone numbers.

For customers 125 that require, for example, two or more telephone numbers, the sales person is able to access the grouped telephone number database 130 using the sales terminal 140. The sales terminal 140 may be configured such that the sales person can input the number of telephone numbers requested by the customer 125 into the sales terminal 140 using a user interface. The number of telephone numbers indicates a group size. The sales terminal 140 is further configured to query the grouped telephone number database 130 for groups of sequential telephone numbers having at least the number of telephone numbers requested by the customer 125. The sales terminal 140 may be configured to generate a list of grouped telephone numbers that meet the customer 125's request and present the list to the sales person, the customer 125, or both. Using the sales terminal 140, the sales person may further assign the group of telephone numbers to the customer 125.

Alternatively, the customer 125 may query the grouped telephone number database 130 without assistance from a sales person by using a personal computing device 120 (not shown), such as a desktop computer, a laptop computer, a netbook, a mobile device, etc. In this exemplary approach, the personal computing device 120 may present the list of grouped telephone numbers to the customer 125, allow the customer 125 to select the desired group of telephone numbers, and assign the selected group of telephone numbers to the customer 125.

If the exact group size requested by the customer 125 is not available, the sales person or customer 125, using the sales terminal 140, may break up a larger group and the remaining telephone numbers may be returned to the grouped number database 135 as a smaller group or to the telephone number database 130 to be assigned to individual customers 125. For example, if the customer 125 requests a group size of 60 telephone numbers, but the smallest group with 60 telephone numbers is a group of 100 telephone numbers, the sales person or customer 125 may select the first 60 of those telephone numbers in the group and the remaining 40 telephone numbers may be stored in the grouped number database 135 so that the group is available to other customers 125. Alternatively, if only a few numbers remain (e.g., fewer than 10 numbers) after a group is broken up, the remaining telephone numbers may be placed in the telephone number database 130 and assigned to individual customers 125.

For customers 125 that only require one telephone number, the sales person may, using the sales terminal 140, access the grouped number database 135 or the telephone number database 130 for telephone numbers that are not part of any groups. The sales person is free to assign any telephone number that is not part of any group to the customer 125 requesting only one telephone number.

As mentioned above, the telephone numbers available to the carrier 105 come from the telephone number authority 110. The telephone number authority 110 may include, for instance, a governing body that distributes unused telephone numbers to carriers 105 based on a protocol, such as the North American Numbering Plan (NANP). The telephone number authority 110 may assign telephone numbers to the carrier 105 based upon a request for telephone numbers from the carrier 105.

Figure 2:
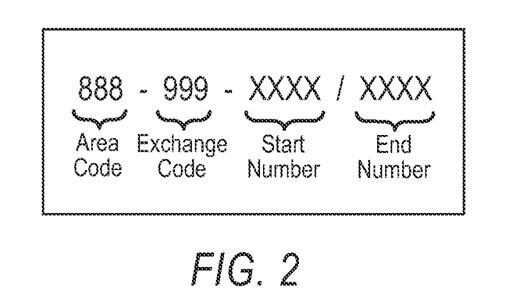
FIG. 2 illustrates an exemplary telephone number format showing a range of telephone numbers included in a list.

As illustrated in FIG. 2, the telephone numbers assigned by the telephone number authority 110 may include a three-digit area code followed by a three-digit exchange code. Each telephone number may end with a four-digit number. In a sequential group of telephone numbers received form the telephone number authority 110, the smallest number is the start number of the group and the largest number is the end number of the group. Both the start number and end number include four digits, and the area code and exchange code are the same for all telephone numbers in the sequential group received from the telephone authority. Therefore, the largest group can include as many as ten thousand telephone numbers (e.g., a start number of "0000" to an end number of "9999").

In general, computing systems and/or devices, such as the computing device 120 and the sales terminal 140, may employ any of a number of well known computer operating systems, including, but by no means limited to, known versions and/or varieties of the Microsoft WINDOWS® operating system, the UNIX® operating system (e.g., the SOLARIS® operating system distributed by Sun Microsystems of Menlo Park, Calif.), the AIX UNIX® operating system distributed by International Business Machines of Armonk, N.Y., and the LINUX® operating system. Examples of computing devices include, without limitation, a computer workstation, a server, a desktop, notebook, laptop, or hand-held computer, or some other known computing system and/or device.

Computing devices generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, JAVA™, C, C++, VISUAL BASIC, JAVA SCRIPT, PERL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as the telephone number database 130 and the grouped telephone number database 130, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 3:
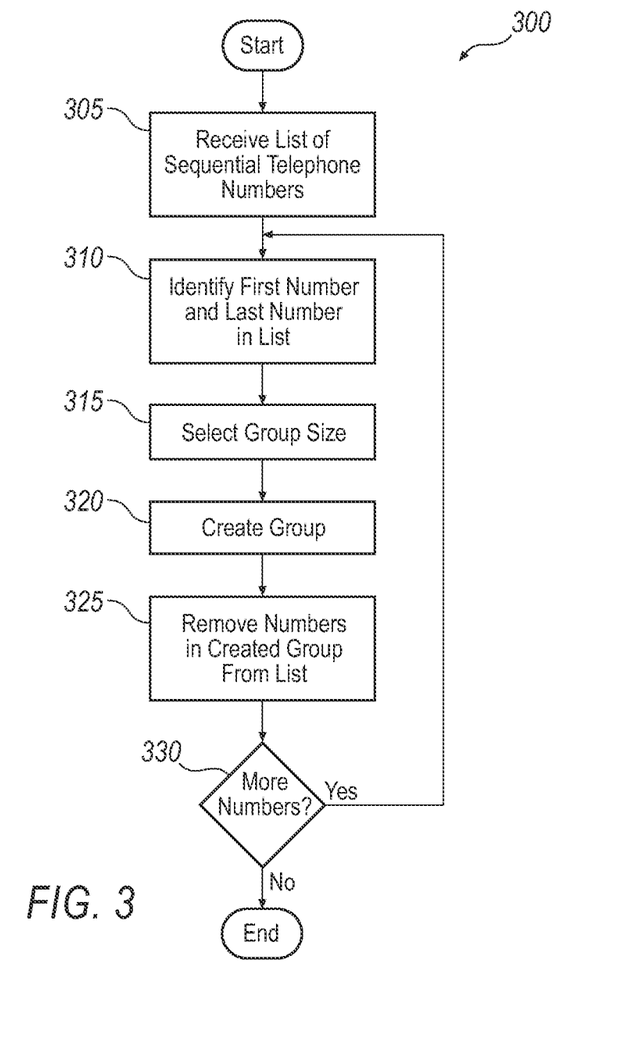
FIG. 3 illustrates a flowchart of an exemplary process performed by the system of FIG. 1.

FIG. 3 illustrates a flowchart of an exemplary process performed by the system 100 of FIG. 1, and in particular, the computing device 120.

Block 305 includes receiving a list 115 of sequential telephone numbers. For instance, the list 115 of sequential telephone numbers may be assigned to the carrier 105 by the telephone number authority 110. The list 115 may be stored in a telephone number database 130 until the carrier 105 can create groups of sequential telephone numbers using the computing device 120.

Block 310 includes identifying a first and last number in the list 115 of sequential telephone numbers. In one exemplary approach, the area code and exchange code of each telephone number in the list 115 is the same. Therefore, the computing device 120 may identify the first and last number in the list 115 by looking at the last four digits of each number in the list 115. The smallest number (e.g., "0000") may be identified as the first number and the largest number (e.g., "9999") may be identified as the last number in the list 115.

Block 315 includes selecting a group size. The computing device 120 may be configured to automatically determine group sizes based on various criteria such as the size of the list 115, the size of the geographic region in which the telephone numbers will be used, or historical data. In one exemplary approach, the computing device 120 may identify several different group sizes to be applied to the list 115 in a specific order. For instance, a first group size (e.g., 10 telephone numbers) is applied to the list 115 during a first iteration of the process 300 and a second group size (e.g., 100 telephone numbers) is applied during a second iteration of the process 300. Of course, selecting the group size may alternatively include selecting a maximum group size. For instance, if the selected group size is 1000 telephone numbers, but only 500 numbers remain in the list 115, the computing device 120 will create a group of 500 telephone numbers.

Block 320 includes creating the group. As discussed in greater detail below with respect to FIGS. 4, 6, and 7, the computing device 120 may create groups of telephone numbers based on the group size selected at block 315.

Block 325 includes removing the telephone numbers in the created group from the list 115 of sequential telephone numbers. Doing so prevents telephone numbers from being assigned to multiple groups during subsequent iterations of the process 300. One exemplary way to remove telephone numbers from the group is described in greater detail below with respect to FIG. 5.

Decision block 330 includes determining whether additional numbers remain in the group. If so, the process 300 continues with block 310 of identifying the first and last number in the list 115. For example, the computing device 120 may increment the end number of the previously-created group by one number and identify the incremented end number as the first number of the list 115 and accordingly, the start number of the next group. If no numbers remain in the group, the process may end after block 330.

Figures 4, 5:
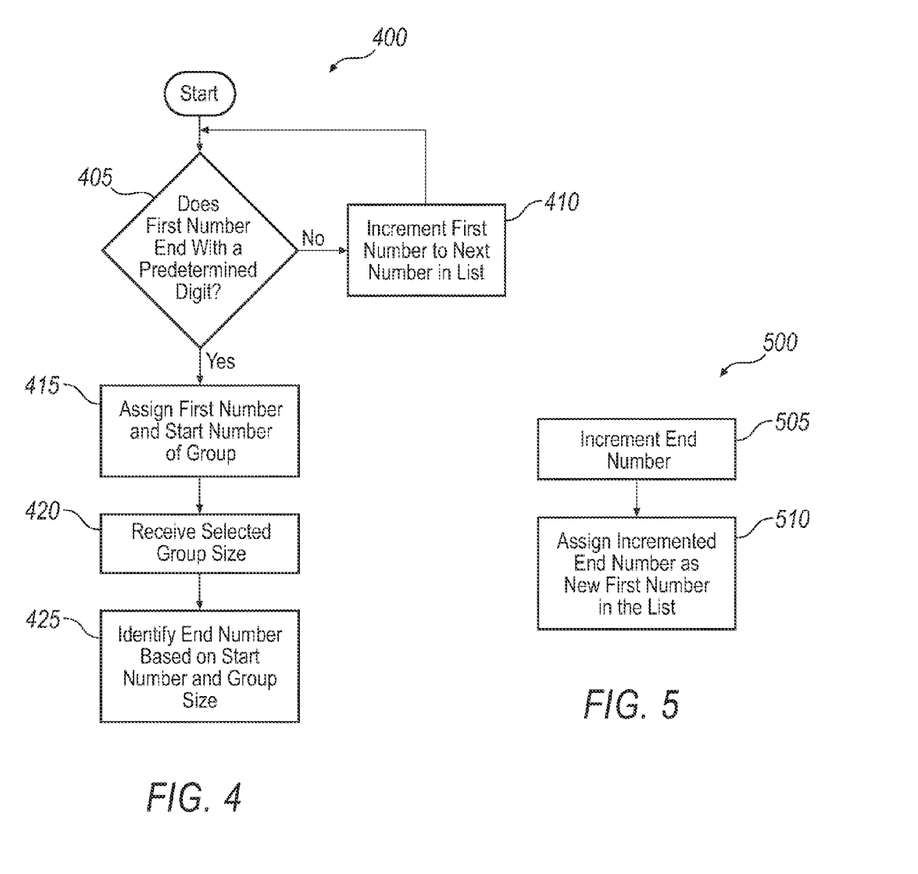
FIG. 4 illustrates a flowchart of an exemplary process of creating a group.
FIG. 5 illustrates a flowchart of an exemplary process of removing the created group from the list of telephone numbers.

FIG. 4 illustrates a flowchart of an exemplary process 400 of creating a group of telephone numbers. This process 400 may occur at block 320 of FIG. 3. In the exemplary approach discussed below, the computing device 120 is configured to iteratively generate groups of sequential telephone numbers based on one or more selected group sizes. Moreover, the computing device 120 is configured to only use specific numbers as the start number for each group. For example, some customers 125 wish to purchase a group of telephone numbers where the first number in the group ends with a "0" and the last number in the group ends with a "9."

Decision block 405 includes determining whether the first number ends with a predetermined digit. In one exemplary approach, the predetermined digit may be "9." This way, the process 400 will not allow the start number in the group to end with the number "9." If the last digit of the first number in the list 115 is "9," the process 400 continues with block 410, which includes incrementing the first number to the next number on the list 115. The first number ending with the number "9" may be removed from the list 115 and stored in the telephone number database 130 as a single telephone number that may be assigned to an individual customer 125.

If the first number does not end with the predetermined digit (e.g., "9"), the process 400 continues with block 415. Block 415 includes assigning the first number as the start number of the group. The start number is the number that may be presented to the customer 125 via the sales terminal 140 or by the sales person. Some customers 125 desire certain start numbers over others. For instance, some customers 125 request start numbers where the last digit is "0."

Block 420 includes receiving the selected group size. As previously discussed with respect to block 315 in FIG. 3, the computing device 120 selects the group size based on various criteria.

Block 425 includes identifying the end number of the group based on the start number and the group size. For instance, if the start number ends with the digits "0050" and the group size is 20 telephone numbers, the computing device 120 will identify the telephone numbers that end with "0050" through "0069" as part of the group.

The process 400 of creating the group may end after block 425.

FIG. 5 illustrates a flowchart of an exemplary process 500 of removing the created group from the list 115 of telephone numbers as illustrated at block 325 in FIG. 3. This way, the computing device 120 does not create groups with one or more of the same telephone numbers. In one exemplary approach, block 505 includes incrementing the end number to the next telephone number on the list 115. Block 510 includes assigning the incremented end number as the start number of the next group.

Figure 6:
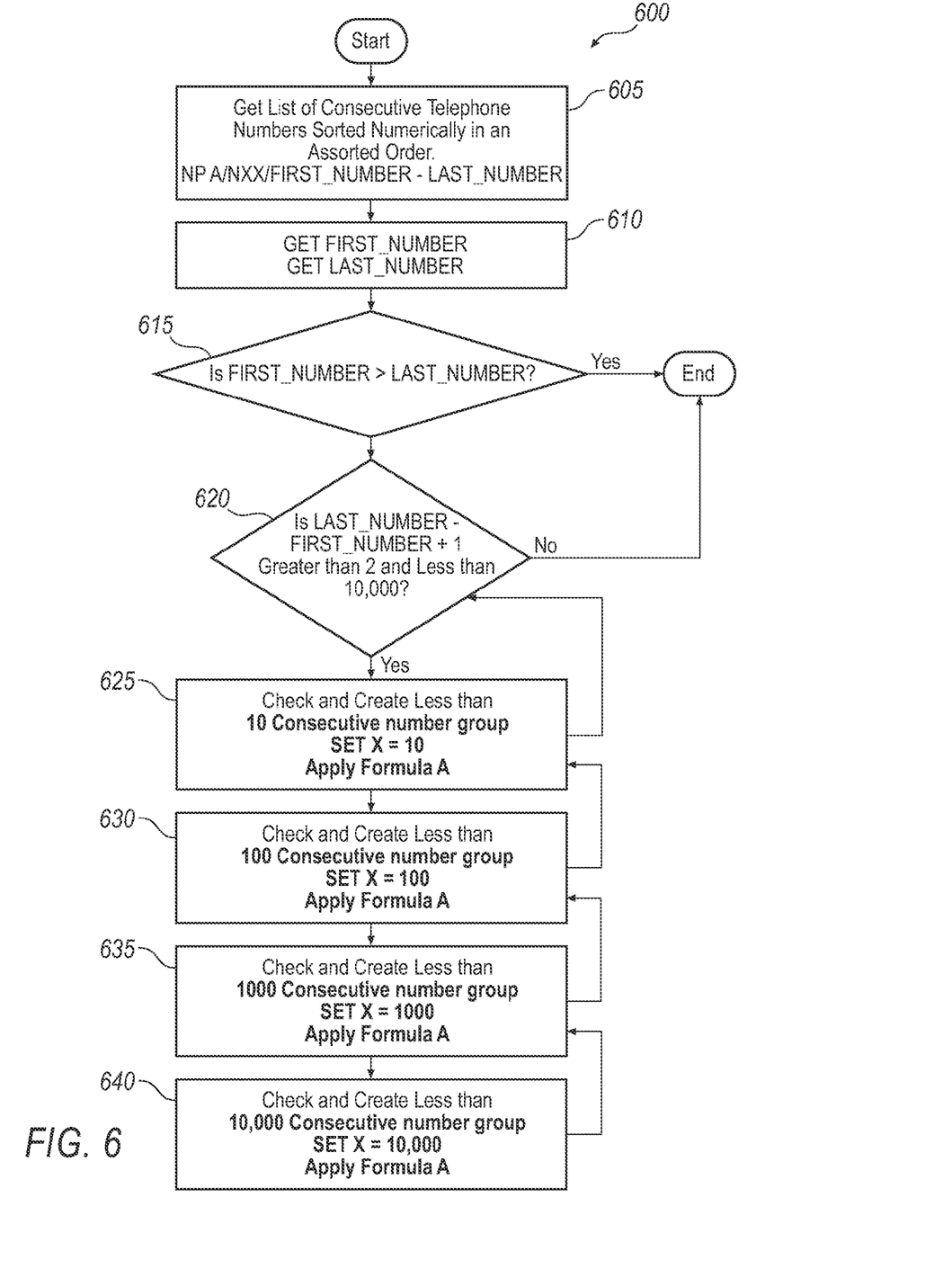
FIG. 6 illustrates a flowchart of another exemplary process performed by the system of FIG. 1.

FIG. 6 illustrates a flowchart of another exemplary process 600 performed by the system 100 of FIG. 1. In this exemplary approach, the computing device 120 iteratively creates the groups based on maximum predetermined group sizes of 10, 100, 1000, 100, and 10, respectively by applying a code such as the exemplary code 700 illustrated in FIG. 7.

Block 605 includes receiving a list 115 of consecutive telephone numbers in ascending order. The telephone numbers may have the same area code and exchange code, which allows the computing device 120 to only look at the last four digits of each telephone number.

Block 610 includes identifying the first number and last number in the list 115 using, for instance, the computing device 120.

Decision block 615 includes determining whether the first number is greater than the last number in the list 115 using, for example, the computing device 120. If so, the list 115 received is not ordered properly and the process 600 may end. If not, the process may continue with decision block 620.

Decision block 620 includes determining that the list 115 includes at least two telephone numbers. The computing device 120 may determine whether the list 115 includes at least two telephone numbers by subtracting the last four digits of the first number from the last four digits of the last number and determining whether the difference between them is greater than one. If not, the process 600 ends. If so, the process continues with block 625.

Block 625 includes creating a group with 10 or fewer telephone numbers. To do so, the computing device 120 may execute a code such as the exemplary code 700 illustrated in FIG. 7 where "X" is equal to the group size, "START_NUM" represents the start number in the group, "END_NUM" represents the end number in the group, "NEW_START_NUM" represents the new start number if the first number in the list 115 does not end with the correct predetermined digit (e.g., the last digit of the start number is the number "9"), and "NEW_END_NUM" represents the new end number in light of the start number and selected group size. After creating the group with 10 or fewer telephone numbers, the process 600 continues with block 630.

Block 630 includes creating a group with 100 or fewer telephone numbers. Again, the computing device 120 may execute the exemplary code 700 illustrated at FIG. 7 using the group size (e.g., "X") of 100 and the new first number after the group created at block 625 is removed from the list 115.

Figure 7:
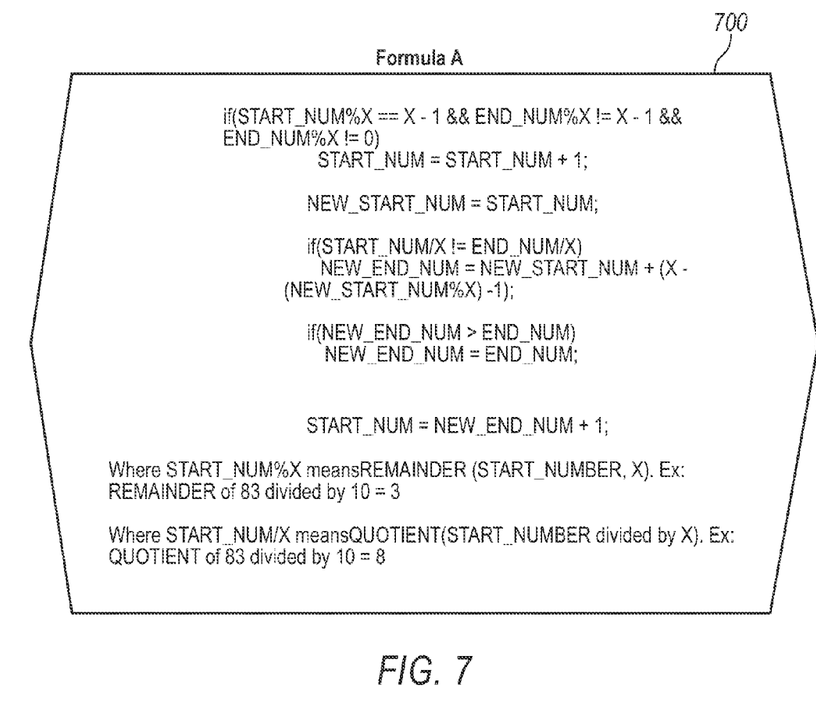
FIG. 7 illustrates an exemplary software code configured to group telephone numbers.

Block 635 includes creating a group with 1000 or fewer telephone numbers by executing, for example, the code 700 illustrated at FIG. 7 where the group size (e.g., "X") is set at 1000. After the group created at block 635, the computing device 120 may remove the telephone numbers in the created group from the list 115, and the process may continue at block 640.

Block 640 includes creating a group with 10,000 or fewer telephone numbers by executing the exemplary code 700 of FIG. 7. In this iteration, the group size (e.g., "X") is equal to 10,000. Once created, all the numbers in the group are removed from the list 115. If any telephone numbers remain, the process 600 continues by returning to block 635, block 630, block 625, or any combination thereof.

The process 600 may end after all the numbers are removed from the list 115 by being grouped or designated as individual telephone numbers.

By way of example, the carrier 105 may have the telephone numbers "888-999-0043" through "888-999-2176" as a group of consecutive vacant telephone numbers stored in the telephone number database 130. Applying the processes 300-600 described above and using the exemplary code 700, the computing device 120 may create the following exemplary seven groups of telephone numbers: 1) "888-999-0043" through "888-999-0049" (e.g., a group of less than 10 consecutive telephone numbers), 2) "888-999-0050" through "888-999-0099" (e.g., a group of less than 100 consecutive telephone numbers), 3) "888-999-0100" through "888-999-0999" (e.g., a group of less than 1000 consecutive telephone numbers), 4) "888-999-1000" through "888-999-1999" (e.g., a group of less than 10,000 consecutive telephone numbers), 5) "888-999-2000" through "888-999-2099" (e.g., a group of less than 1000 consecutive telephone numbers), 6) "888-999-2100" through "888-999-2169" (e.g., a group of less than 100 consecutive telephone numbers), and 7) "888-999-2170" through "888-999-2176" (e.g., a group of less than 10 consecutive telephone numbers).

Figure 8:
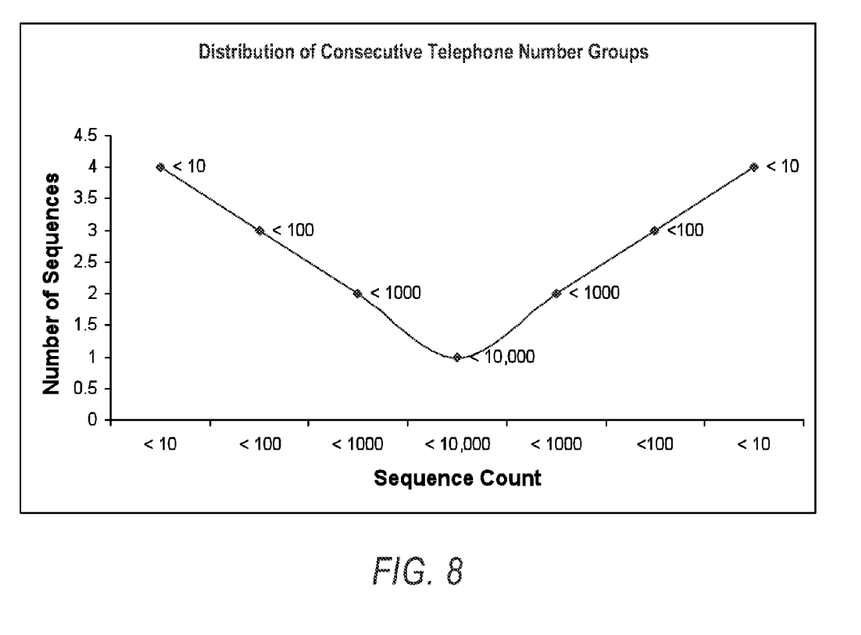
FIG. 8 illustrates an exemplary graph of the uniform distribution of telephone number groups.

Accordingly, the carrier 105 can create uniform groups of vacant consecutive telephone numbers. For instance, as illustrated in FIG. 8, with a consecutive group of 10,000 vacant telephone numbers (e.g., subscriber numbers "0000" through "9999" with the same area code and exchange code), the computing device 120 can generate eight groups with fewer than 10 telephone numbers, six groups with fewer than 100 telephone numbers, four groups with fewer than 1000 telephone numbers, and one group with fewer than 10,000 telephone numbers.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method comprising:
receiving a list of sequential telephone numbers; and
via a computing device, iteratively:
identifying a first number and a last number of the list;
selecting a group size;
incrementing the first number until the first number no longer ends with at least one predetermined digit,
designating the incremented first number as a start number,
designating any telephone numbers before the start number as individual telephone numbers to individual consumers,
creating a group of sequential telephone numbers from the list of sequential telephone numbers based on the start number and the selected group size, and
removing the created group and the individual telephone numbers from the list of sequential telephone numbers.

2. A method as set forth in claim 1, wherein creating the group of sequential telephone numbers includes determining whether the first number ends with the at least one predetermined digit.

3. A method as set forth in claim 2, wherein the at least one predetermined digit includes nine.

4. A method as set forth in claim 1, wherein creating the group of sequential telephone numbers includes identifying an end number in the group of sequential telephone numbers based on the start number and the selected group size.

5. A method as set forth in claim 4, wherein removing the created group from the list of sequential telephone numbers includes:
incrementing the end number of the group; and
identifying the incremented end number as the first number of a subsequent group of sequential telephone numbers.

6. A method as set forth in claim 1, further comprising determining whether the first number is less than the last number to determine whether the telephone numbers are listed in sequential order, wherein creating the group occurs only if the telephone numbers are listed in sequential order.

7. A method as set forth in claim 1, further comprising determining whether the list of sequential telephone numbers includes at least two telephone numbers, wherein creating the group occurs only if the list of sequential telephone numbers includes at least two telephone numbers.

8. A method as set forth in claim 1, wherein the group size is selected by the computing device.

9. A method as set forth in claim 1, wherein multiple group sizes are selected based at least in part on a total number of telephone numbers in the list.

10. A method as set forth in claim 1, wherein an end number in the created group ends with the at least one predetermined digit.

11. A non-transitory computer-readable medium tangibly embodying computer-executable instructions that when executed provide operations comprising:
   receiving a list of sequential telephone numbers; and
   via a computing device, iteratively:
      identifying a first number and a last number of the list;
      selecting a group size;
      incrementing the first number until the first number no longer ends with at least one predetermined digit,
      designating the incremented first number as a start number,
      designating any telephone numbers before the start number as individual telephone numbers to individual consumers,
      creating a group of sequential telephone numbers from the list of sequential telephone numbers based on the start number and the selected group size, and
      removing the created group and the individual telephone numbers from the list of sequential telephone numbers.

12. A computer-readable medium as set forth in claim 11, wherein creating the group of sequential telephone numbers includes determining whether the first number ends with at least one of the predetermined digits.

13. A computer-readable medium as set forth in claim 11, wherein creating the group of sequential telephone numbers includes identifying an end number in the group of sequential telephone numbers based on the start number and the selected group size.

14. A computer-readable medium as set forth in claim 13, wherein removing the created group from the list of sequential telephone numbers includes:
   incrementing the end number of the group; and
   assigning the incremented end number as the first number of a subsequent group of sequential telephone numbers.

15. A computer-readable medium as set forth in claim 11, further comprising determining whether the list of sequential telephone numbers includes at least two telephone numbers.

16. A system as set forth in claim 11, wherein the group size is selected by the computing device and is based at least in part on a total number of telephone numbers in the list.

17. A system as set forth in claim 11, wherein an end number in the created group ends with the at least one predetermined digit.

18. A system comprising:
   a computing device configured to receive a list of sequential telephone numbers, and iteratively: identify a first number and a last number of the list, select a group size, increment the first number until the first number no longer ends with at least one predetermined digit, designate the incremented first number as a start number, designate any telephone numbers before the start number as individual telephone numbers to individual consumers create a group of sequential telephone numbers from the list of sequential telephone numbers based on the start number and the selected group size, and remove the created group and the individual telephone numbers from the list of sequential telephone numbers,
   wherein the computing device is configured to create multiple groups of sequential telephone numbers based on the list, wherein at least two of the created groups include different numbers of telephone numbers.

19. A system as set forth in claim 18, wherein the group size is selected based at least in part on a total number of telephone numbers in the list.

20. A system as set forth in claim 18, wherein an end number in the created group ends with the at least one predetermined digit.

* * * * *